US006878227B2

(12) United States Patent
Xu et al.

(10) Patent No.: US 6,878,227 B2
(45) Date of Patent: Apr. 12, 2005

(54) MEDIA HAVING INK-RECEPTIVE COATINGS FOR HEAT-TRANSFERRING IMAGES TO FABRICS

(75) Inventors: Zhong Xu, Worcester, MA (US); Robert M. Conforti, Wakefield, RI (US); William M. Risen, Jr., Rumford, RI (US)

(73) Assignee: Arkwright, Inc., Fiskeville, RI (US)

(*) Notice: Subject to any disclaimer, the term of this patent is extended or adjusted under 35 U.S.C. 154(b) by 0 days.

(21) Appl. No.: 10/725,710

(22) Filed: Dec. 2, 2003

(65) Prior Publication Data

US 2004/0108050 A1 Jun. 10, 2004

Related U.S. Application Data

(60) Provisional application No. 60/430,218, filed on Dec. 2, 2002.

(51) Int. Cl.[7] .......................... B44C 1/165; B32B 3/20; C09J 7/02; B41M 3/12; C08L 101/08

(52) U.S. Cl. ....................... 156/230; 156/239; 156/240; 156/247; 156/277; 156/289; 427/146; 427/148; 428/42.1; 428/195.1; 428/202; 428/348; 428/914; 101/33; 101/34; 106/270; 523/160

(58) Field of Search ................................ 156/230, 239, 156/240, 241, 247, 272.2, 275.5, 277, 289; 427/146, 147, 148, 150; 428/40.1, 40.5, 41.6, 41.7, 42.1, 47.7, 195.1, 200, 201, 202, 343, 347, 348, 355 AC, 914; 101/33, 34; 106/31.13, 270, 822, 316, 523; 523/160

(56) References Cited

U.S. PATENT DOCUMENTS

| | | | | | |
|---|---|---|---|---|---|
| 4,758,952 | A | * | 7/1988 | Harris et al. | 101/487 |
| 5,418,078 | A | * | 5/1995 | Desie et al. | 428/32.3 |
| 5,478,631 | A | * | 12/1995 | Kawano et al. | 428/32.1 |
| 5,488,907 | A | * | 2/1996 | Xu et al. | 101/488 |
| 5,766,398 | A | * | 6/1998 | Cahill et al. | 156/240 |
| 6,071,368 | A | * | 6/2000 | Boyd et al. | 156/240 |
| 6,703,086 | B2 | * | 3/2004 | Kronzer et al. | 156/235 |
| 6,723,773 | B2 | * | 4/2004 | Williams et al. | 524/378 |

* cited by examiner

*Primary Examiner*—J. A. Lorengo
(74) *Attorney, Agent, or Firm*—Barlow, Josephs & Holmes, Ltd.

(57) ABSTRACT

An improved ink-jet printable heat-transfer medium comprising a base substrate having a surface coated with a hot-melt layer and an ink-receptive layer is provided. The ink-receptive layer comprises: i) non-polymeric organic particles that are a reaction product of a diamine and two molecules, each molecule having at least one carboxylic acid group and at least five carbon atoms, ii) thermoplastic polymer particles, and iii) a thermoplastic film-forming binder. The heat-transfer paper can produce printed images having improved color quality, hand, and wash-durability on a variety of fabric materials.

3 Claims, No Drawings

MEDIA HAVING INK-RECEPTIVE COATINGS FOR HEAT-TRANSFERRING IMAGES TO FABRICS

CROSS-REFERENCE TO RELATED APPLICATIONS

This application claims the benefit of U.S. Provisional Application No. 60/430,218 having a filing date of Dec. 2, 2002, the entire contents of which are hereby incorporated by reference.

BACKGROUND OF THE INVENTION

1. Field of the Invention

The present invention relates to ink-jet, heat-transfer media that are coated with certain ink-receptive coatings. An ink-jet printer can be used to print an image on the heat-transfer medium, and the printed image can be heat-transferred to a fabric material.

2. Brief Description of the Related Art

Ink-jet printers are used commonly today in a wide variety of printing applications. Most inks used in ink-jet printers are aqueous-based inks containing water as their primary component. These aqueous-based inks contain molecular dyes and/or pigmented colorants. Small amounts of water-miscible solvents such as glycols and glycol ethers can also be present. The intended medium for receiving the ink (e.g., a paper or film) can be coated with an ink-receptive composition in the manufacturing of the medium. A conventional ink-jet printer can be used to print an image onto the coated medium. During the printing step, dyes or colorants from the ink can penetrate into the ink-receptive coating on the medium. Then, water and other solvents, if present, can evaporate from the printed medium as the medium is dried.

The ink-jet media industry continuously devotes research efforts to developing new ink-receptive coatings. A primary research goal is to make a coated medium that accepts and holds the ink so that a good quality image is recorded on the medium. Producing colored images having high color brightness and vibrancy are key objectives. Moreover, it is important that the quality of the image be maintained after the image is exposed to water and other liquids. These properties are particularly important for ink-jet, heat-transfer papers that are used to create images on fabric substrates such as tee-shirts.

In recent years, there has been a growing interest in using ink-jet, heat-transfer media to transfer images (e.g., photos, text, illustrations, graphic designs, and the like) to tee-shirts, sweatshirts, and other fabric materials. Consumers have found these products easy to use with conventional desktop computers and printers to create personalized designs on clothing. Generally, the process involves using a desktop computer to generate a computerized image and sending it to an ink-jet printer that uses aqueous-based ink to print the image onto a heat-transfer paper. Then, the printed image can be heat-transferred from the paper to a receptor fabric substrate, e.g. tee-shirt, using a heating means such as a hand iron or heat press. Commercially-available ink-jet, heat-transfer papers typically comprise a support paper having a surface coated with an ink-receptive layer for recording the printed image on the paper.

In many instances, the coated ink-receptive layer used for such heat-transfer papers comprises particles of a thermoplastic polymer and a film-forming binder. The polymer particles and film-forming binder form a porous coating structure that absorbs the aqueous ink vehicle (water). As ink is impinged onto the porous coating in the ink-jet printing step, it can enter interstitial voids and spaces in the coating structure.

For example, Kronzer, U.S. Pat. No. 5,242,739 discloses an image-receptive, heat-transfer paper which includes: (a) a flexible cellulosic non-woven web base sheet; and (b) an image-receptive melt-transfer film layer overlaying the base sheet. The film layer is composed of from about 15 to 80 percent by weight of a film-forming binder and from about 85 to about 20 percent by weight of a powdered thermoplastic polymer. The powdered thermoplastic polymer is preferably selected from the group consisting of polyolefins, polyesters, and ethylene-vinyl acetate copolymers.

Kronzer, U.S. Pat. No. 5,271,990 discloses an image-receptive, heat-transfer paper coated with an image-receptive, melt-transfer film layer having a Sheffield Smoothness of about 10 cc/minute. The image-receptive film layer overlays the base sheet. The image-receptive layer comprises a film-forming binder and particles of a thermoplastic polymer. Preferably, the thermoplastic polymer particles are selected from the group consisting of polyolefins, polyesters, and ethylene-vinyl acetate copolymers.

Kronzer, U.S. Pat. No. 5,501,902 discloses ink-jet printable, heat-transfer materials having a first layer (e.g., film or paper), and a second layer overlaying the first layer. The second layer comprises a film-forming binder such as a polyacrylate, polyethylene, or ethylene-vinyl acetate copolymer, and particles of a thermoplastic polymer having dimensions of less than 50 micrometers. According to the '902 patent, the powdered thermoplastic polymer is desirably selected from the group consisting of polyolefins, polyesters, and ethylene-vinyl acetate copolymers. Further, the second layer may comprise a cationic polymer (e.g., an amide-epichlorohydrin polymer), a humectant (e.g., ethylene glycol or polyethylene glycol), ink-viscosity modifier (e.g., polyethylene glycol), a weak acid (e.g., citric acid), and/or a surfactant.

Kronzer, U.S. Pat. No. 5,798,179 discloses ink-jet printable, heat-transfer papers having cold release properties. The heat-transfer paper is coated with multiple layers comprising particles of thermoplastic polymers and film-forming binders. The '179 patent discloses that the fourth layer is useful for recording images from inkjet printers and contains a film-forming binder and thermoplastic polymer particles selected from the group consisting of polyolefins, polyesters, polyamides, and ethylene-vinyl acetate copolymers.

Sato et al., U.S. Pat. No. 6,139,672 discloses an ink-jet recording medium for transfer printing images onto fabrics. The medium comprises a base material, a releasing layer, and a transfer layer. The transfer layer contains fine particles of a thermoplastic resin, a thermoplastic resin binder, a cationic resin, and inorganic fine particles. Fine particles of polyethylene, polypropylene, poly(meth)acrylic acid, poly(meth)acrylates, polyvinyl acetate, polyvinyl chloride, polyurethane, polyamide and copolymers thereof are more preferably used according to the '672 patent.

Bamberg et al., U.S. Pat. No. 6,638,604 discloses an ink-jet transfer system for applying graphic presentations, patterns, images, or typing onto light-colored clothing articles. The ink-jet transfer system comprises a carrier material (e.g., a silicone-coated or non-coated paper), a hot-melt layer overlaying the carrier material, and an ink-receiving layer overlaying the hot-melt layer. The hot-melt layer may comprise a dispersion of an ethylene/acrylic acid copolymer. The ink-receiving layer may comprise a polyamide binder and a highly porous polyamide pigment.

Although some conventional ink-jet, heat-transfer media products can effectively produce images having generally good color print quality on fabric substrates, there is still a need for an improved heat-transfer medium capable of generating images having improved color vibrancy and brightness.

In addition, many known ink-jet, heat-transfer media products produce images have a rough "hand" on the fabric. The "hand" of the printed image on the fabric refers to the tactile qualities of the imaged fabric, particularly the softness or hardness of the image after it has been transferred to the fabric. Printed images on the fabric having a soft and smooth feel are more desirable over hard and rough printed images. There is a need for an improved heat-transfer medium that will produce images having a softer hand on the fabric.

Furthermore, there is a need for heat-transfer media that can produce images having improved wash-durability. Wash-durability is a particular problem with many conventional heat-transfer papers. When such heat-transfer papers are used, the transferred image may develop cracks and colors may fade after repeated washings and dryings of the fabric. In view of the foregoing problems with conventional ink-jet, heat-transfer papers, there is a need for an improved heat-transfer paper capable of providing printed images having improved color quality, hand, and wash-durability on fabric materials. The present invention provides such a heat-transfer paper. These and other objects, features, and advantages of this invention are evident from the following description.

SUMMARY OF THE INVENTION

The present invention relates to an ink-jet printable, heat-transfer medium comprising a base substrate having a surface coated with a hot-melt layer and an ink-receptive layer. Papers, particularly silicone-coated papers, can be used as the base substrate. The hot-melt layer comprises a thermoplastic polymer having a melting point in the range of about 60° C. to about 180° C. The ink-receptive layer comprises (i) non-polymeric organic particles that are a reaction product of a diamine and two molecules, each molecule having at least one carboxylic acid group and at least five carbon atoms, (ii) thermoplastic polymer particles, and (iii) a thermoplastic film-forming binder having a melting point in the range of about 60° C. to about 180° C.

The non-polymeric organic particles have a molecular weight in the range of about 400 to about 1000. In one embodiment, the non-polymeric organic particles comprises N,N'-1,2-ethanediylbisoctadecanamide. Preferably, the thermoplastic polymer particles are polyamide particles, and the thermoplastic film-forming binder in the ink-receptive layer is a polyamide resin. The ink-receptive layer may further comprise a dye fixative agent such as an organic metal complex.

The invention also includes methods for applying an image to a fabric material such as a T-shirt using the above heat-transfer medium. An ink-jet printer is used to print an image on the medium. Then, the imaged medium is placed on a fabric so that the printed image is facing downwards. Heat is applied to the backside of the medium to transfer the image to the fabric. An iron can be used to apply the heat to the medium. Then, the substrate is peeled away from the printed image on the fabric.

DETAILED DESCRIPTION OF THE INVENTION

The ink-jet printable, heat-transfer medium of this invention can be made using any suitable base substrate such as a paper, film, non-woven web, or the like. Examples of suitable support papers include plain papers, clay-coated papers, and resin-coated papers such as polyethylene-coated papers and latex-impregnated papers. The thickness of the base substrate may vary, but it is typically in the range of about 2 mils (51 μm) to about 10 mils (254 μm). The base substrate has a front surface and a back surface. A graphic design, product trademark, company logo, or the like may be printed on the back surface of the substrate. The base substrate may have a scored, peel line so that it may be removed from the coated layers as described in Cole et al., U.S. Pat. No. 6,582,803, the disclosure of which is hereby incorporated by reference. Also, the front surface, i.e., imaging surface, of the substrate may be coated first with a stick-resistant composition such as silicone. The stick-resistant coating allows a person to peel away the support paper from the other coated layers after the printed image has been heat-transferred to the fabric.

The hot-melt layer is applied to the base substrate in accordance with this invention. The hot-melt layer and printed image on the medium are heat-transferred to the fabric by means of pressing the hot-melt layer into the fabric with a heating means such as a hot iron as described in further detail below. The hot-melt layer helps the transferred image adhere to the fabric, and it typically comprises a thermoplastic polymer. Suitable thermoplastic polymers for use in the hot-melt layer include, for example, waxes, polyamides, polyolefins, polyesters, poly(vinyl chloride), poly(vinyl acetate), polyacrylates, polystyrene, acrylic acid, methacrylic acid, and copolymers and mixtures thereof. The thermoplastic polymer typically has a melting point in the range of about 60° C. to about 180° C. Preferably, an ethylene/acrylic acid, ethylene/methacrylic acid, or ethylene/vinyl acetate copolymer is used in the hot-melt layer.

The ink-receptive layer of this invention is applied over the hot-melt layer. The ink-receptive layer is capable of absorbing aqueous-based inks from an ink-jet printer to form a high quality colored image on the medium. By the term, "image", it is meant any printed mark including, but not limited to, text, numbers, symbols, patterns, photographs, graphic designs, and the like. The ink-receptive layer comprises a combination of non-polymeric organic particles; particles of a thermoplastic polymer; and a thermoplastic polymer film-forming binder.

Non-Polymeric Organic Particles

The non-polymeric organic particles used in the ink-receptive layer of this invention can be considered a reaction product of a diamine and two molecules, each molecule having at least one carboxylic acid group and at least five carbon atoms. The reaction product is not a polymer, of course, and the reaction product has a molecular weight in the range of about 400 to about 1000 grams/mole and more preferably in the range of about 500 to 700 grams/mole. A suitable non-polymeric amide particle that can be used in the ink-receptive layer of this invention is N,N'-1,2-ethanediylbisoctadecanamide. These non-polymeric particles are available under the tradename, MICHEM 439 from Michelman, Inc. (Cincinnati, Ohio).

It has been found that such non-polymeric organic particles impart several advantageous properties to the ink-receptive coating and resulting imaged fabric. Particularly, the non-polymeric organic particles have some dye-fixing properties. The particles may interact with and stabilize anionic dyestuffs found in aqueous-based inks. As a result, a high-quality colored image may be recorded onto the ink-receptive coating, and the printed colored image may be transferred to the fabric in accordance with this invention. The resulting colored image on the fabric exhibits good color vibrancy and brightness.

In addition, the non-polymeric organic particles help impart a softer hand to the printed image on the fabric in contrast to conventional ink-receptive coatings which do not contain such non-polymeric particles. While not wishing to be bound by any theory, it is believed that the low molecular weight of the particles enhances the transferability of the imaged ink-receptive layer to the fabric. The imaged ink-receptive layer, containing the low molecular weight, non-polymeric organic particles, can better flow into the fibrous network of the fabric during the heat-transferring step.

Beneficial effects are observed when the ink-receptive layer comprises at least about 20% by weight non-polymeric organic particles based on dry weight of the layer. The ink-receptive layer typically comprises the non-polymeric organic particles in an amount in the range of about 20 to about 70% by weight. Preferably, the ink-receptive layer comprises about 30 to about 60% by weight non-polymeric organic particles.

Particles of Thermoplastic Polymers

The ink-receptive layer of this invention contains thermoplastic polymer particles in addition to the above-described non-polymeric organic particles. These thermoplastic polymer particles are important, because they impart a porous structure to the coated layer. This porous structure enables the ink-receptive layer to better absorb the aqueous ink vehicle (water). The polymer particles form interstitial pores or voids in the coating for wicking and retaining the ink. When the ink is impinged onto the layer, it can enter the interstitial voids and spaces in the coating structure.

Further, the high molecular weight nature of the thermoplastic polymer particles helps provide cohesion and mechanical integrity to the ink-receptive layer. This structural integrity helps provide the printed image with good wash-durability after it has been transferred to the fabric.

Suitable thermoplastic polymer particles include, for example, polyolefin, polyamide, and polyester particles. Preferably, substantially porous thermoplastic particles having a high surface area are used. These porous particles can absorb the ink vehicles, themselves, in addition forming open voids in the coating structure. For example, the particles may have a particle size distribution containing particles with a diameter size in the range of 5 $\mu$m to 50 $\mu$m and a surface area in the range of 10 $m^2/g$ to 40 $m^2/g$. A particularly preferred particulate material is ORGASOL (polyamide particles) available from Elf Atochem North America, Inc.

The ink-receptive layer preferably comprises about 20 to about 70 percent by weight and more preferably about 30 to about 50 weight % thermoplastic polymer particles based on dry weight of the layer.

Thermoplastic Polymer Binder

The thermoplastic polymer binder used in the ink-receptive layer of this invention forms a film-like coating that holds the above-described non-polymeric and polymeric particles in place. The thermoplastic binder forms a thin continuous sheet-like structure which retains the particles. The thermoplastic binder provides cohesion and mechanical integrity to the ink-receptive layer. Suitable thermoplastic film-forming binders include, for example, polyamides, polyolefins, polyesters, polyurethanes, poly (vinyl chloride), poly(vinyl acetate), polyethylene oxide, polyacrylates, polystyrene, polyacrylic acid, and polymethacrylic acid. Copolymers and mixtures thereof also can be used. For example, ethylene/acrylic acid, ethylene/methacrylic acid, and ethylene/vinyl acetate copolymers can be used. Preferably, ELVAMIDE 8023 (a polyamide resin), available from DuPont, is used as the film-forming binder.

In general, the thermoplastic polymer binder has a melting point in the range of about 60° C. to about 180° C. and preferably is in the range of about 100° C. to about 150° C. The ink-receptive layer preferably comprises about 5 to about 50 percent by weight and more preferably about 10 to about 30 weight % thermoplastic polymer binder based on dry weight of the layer.

In a preferred embodiment, the ink-receptive layer comprises: 1) non-polymeric organic particles that are a reaction product of a diamine and two molecules, each molecule having at least one carboxylic acid group and at least five carbon atoms; 2) thermoplastic polyamide particles; and 3) a polyamide film-forming binder. The non-polymeric amide particles, polyamide particles, and polyamide binder provides an ink-receptive coating with good dye-fixing properties. After the printed image has been heat-transferred to the fabric, the transferred image has a relatively soft hand and good wash-durability. Although not wishing to be bound by any theory, it is believed that the compatibility and synergy of the amide and polyamide materials helps impart these desirable properties. The interaction of the amide and polyamide materials may be enhanced when the medium is heated during transferring of the image to the fabric. Improved interaction between the amide and polyamide materials may improve the softness and feel of the printed image on the fabric.

In addition to the above-described non-polymeric organic particles, thermoplastic polymer particles, and thermoplastic polymer binders, the ink-receptive layer may contain additional dye fixative additives. These additives may further enhance the color quality of the printed image. Conventional dye fixative agents may be used in accordance with this invention.

Also, it is recognized that other materials can be used as dye fixatives in the ink-receptive layer described above. For instance, "decorated" inorganic particles having attached chemical functional groups, such as silica particles with pendant polyethyleneimine (available from Purity Systems, Inc., Missoula, Mont. as "VP-1"); silica particles with pendant polyvinylamine (available from Purity Systems, Inc. as "WP-2"); and trimethylammonium chloride propylsilicate particles (available from Silicycle, Inc., Quebec City, Canada as "Si-TMA Chloride particles) can be used.

In addition, cross-linked organic polymer particles such as Luvicross M (cross-linked polyvinylpyrrolidone, available from BASF); and LiquiBlock 88HS (cross-linked polyacrylic acid sodium salt, available from Emerging Technologies, Inc. of Greensboro, N.C.); and decorated organic particles such as polyacrylate particles with pendant cationic quaternary amine groups (available as TruDot P2602 from MeadWestvaco, Charleston, S.C.) can be used. Cationic materials are also known dye fixatives, and these materials can be used as well. For instance, "DP6-6307" polyacrylates from Ciba Chemicals can be used.

Finally, it has been found that organic metal complexes can be used in the ink-receptive layer to fix the dyes from the ink-jet ink. For example, Chartwell B-515.1 from Chartwell International, Inc. (North Attleboro, Mass.) which is a bimetallic amine complex containing the metal, zirconium, can be used. Another type of organic metal complex that can be used in accordance with this invention is an aluminum chlorohydrol solution available from Grace Davison (Columbia, Md.) as Sylojet A200. The chemical structure of Sylojet A200 is $Al_2(OH)_5Cl$.

The ink-receptive layer overlays the hot-melt layer on the base substrate. In some instances, it may be desirable to include one or more intermediate coating layers between the hot-melt layer and ink-receptive layer. Also, it may be desirable to coat the medium with multiple ink-receptive layers. The base substrate may be coated with a layer of silicone or other stick-resistant composition and/or a primer layer before the hot-melt and ink-receptive layers are applied.

Also, the above-described coating layers may contain additives such as plasticizers, surface active agents that control the wetting or flow behavior of the coating solutions, antistatic agents, suspending agents, antifoam agents, acidic compounds to control pH, optical brighteners, UV blockers/stabilizers, and the like.

Conventional coating techniques can be used to apply the coating layers to the base substrate. For example, roller, blade, wire bar, dip, solution-extrusion, air-knife, and gravure coating techniques can be used. Typically, the total weight of the coating layers is in the range of 20 to 80 grams per square meter (gsm) and preferably 40 to 60 gsm. The coating layers may be dried in a conventional oven.

The ink-jet transfer papers of this invention can be printed with an image using any conventional ink-jet printer. For example, ink-jet printers made by Océ, Hewlett-Packard, Epson, Encad, Canon, and others can be used. The printed image can be transferred to any fabric material such as sweatshirts, T-shirts, cotton bags, computer mouse pads, and the like. Fabrics made from 100% cotton or cotton/polyester blends are particularly suitable.

The printed image can be transferred to the fabric material by various methods using an ordinary household iron, heat press, or other heating means. The printed image on the heat-transfer medium can be heat-transferred effectively at a temperature in the range of about 120° to 170° C. which is the common temperature range for household irons. The heat-transfer media of this invention are particularly suitable for transferring images to light-colored fabrics, e.g., white T-shirts. A preferred method for transferring the image to a white T-shirt comprises the following steps:

a) printing an image on the heat-transfer medium with an ink-jet printer (the image is printed as a mirror image of the original image);

b) placing the medium containing the printed image on a fabric material (e.g., white T-shirt) so that the printed image faces downwards and is in direct contact with the fabric;

c) hand-ironing the backside of the medium (the base substrate) so that the imaged film coating is pressed into the fabric and the image is transferred to the fabric; and d) peeling the base substrate away from the transferred printed image.

Alternatively, other heat-transfer methods as known in the art can be used to transfer the printed image to the fabric. The ink-jet heat-transfer media of the present invention can be used to produce printed images having improved color print quality, hand, and wash-durability on fabric materials.

The present invention is further illustrated by the following examples using the below-described test methods, but these examples should not be construed as limiting the scope of the invention.

Test Methods

Print-Quality

The inkjet, heat-transfer papers were printed with multi-color test patterns using an HP 970CSE desktop ink-jet printer in an "iron-on transfer" mode. Then, the printed heat-transfer papers were visually inspected to determine color print quality as characterized by the densities of the primary and secondary colors and inter-color bleeding. The print quality of images having significant inter-color bleeding and/or low color densities was considered poor. The print quality of images having no inter-color bleeding and high color densities was considered excellent.

Ironing

A printed image was heat-transferred to 100% cotton white T-shirts using an ordinary household hand iron per the above-described preferred method. The iron was set at "maximum cotton" and heated. The hot iron was applied to the backside of the heat-transfer medium using moderate pressure for about two (2) to three (3) minutes. After cooling for about three (3) to five (5) minutes, the base substrate was peeled away from the T-shirt to produce a T-shirt having a printed image.

Color Fastness (After-Wash)

After about twenty-four (24) hours, the above-described ironed T-shirts were washed and dried under the following conditions:

a) Kenmore 70 Series Heavy Duty Washer

Speed (Agitate/Spin): Delicate (slow/slow)

Water Temp. (Wash/Rinse): Cold/Cold

Water Level: Small to medium load

Washing: Ultra clean 10 cycle b) Kenmore Heavy Duty Dryer

Setting: Knit/Delicate

The above washing and drying cycle was repeated five (5) times. Then, the printed T-shirts were visually inspected to determine color-fastness of the image and graded accordingly (poor, fair, good, or excellent). Images having significant color fading were considered to have poor color-fastness, while images having little or no color fading were considered to have excellent color-fastness.

Hand of Printed Image on T-Shirt (After-Wash)

The printed images on the above-described after-wash T-shirts were manually inspected to determine the hand of the printed image and graded accordingly (soft, medium softness, or rough). T-shirts having a soft hand or medium soft hand were considered desirable.

EXAMPLES

Example 1

In this Example 1, the following coating formulations were prepared. The weight percentages of the components in the coating are approximate weights based on total weight of the coating formulation.

| | Weight % |
|---|---|
| Hot Melt Coating | |
| ENOREX VN 379 [1] | 100% |
| Ink-Receptive Coating | |
| Water | 28% |
| Ethanol | 47% |
| Elvamide 8023 [2] | 5% |
| Orgasol 3501 [3] | 10% |
| Michem 439 [4] | 10% |

[1] An aqueous dispersion containing polymerized acrylic acid, ethylene, methyl methacrylate, 2-ethylhexyl acrylate, and ammonia, available from Collano Ebnother AG (Switzerland).
[2] Polyamide binder resin, available from DuPont (Wilmington, Delaware).
[3] Polymeric particles of a polyamide, available from Elf Atochem North America.
[4] Non-polymeric particles of N,N'-1,2-ethanediylbisoctadecanamide, available from Michelman, Inc. (Cincinnati, Ohio).

The above-described hot-melt and ink-receptive coatings were applied to a base substrate as further described below.

The resulting ink-receptive layer contained about 40 weight % of polyamide particles (Orgasol 3501 EX D); about 40 weight % of non-polymeric organic particles (Michem 439); and about 20 weight % of a thermoplastic polyamide film-forming binder (Elvamide 8023) based on total dry weight of the ink-receptive layer.

Example 2

In this Example 2, the coating formulations as described in above Example 1 were prepared, except the components in the ink-receptive coating were adjusted so that the resulting ink-receptive layer contained about 20 wt. % of polyamide particles (Orgasol 3501); about 60 wt. % of non-polymeric organic particles (Michem 439); and about 20 wt. % of a thermoplastic polyamide film-forming binder (Elvamide 8023) based on total dry weight of the ink-receptive layer.

Example 3

In this Example 3, the coating formulations as described in above Example 1 were prepared, except the components in the ink-receptive coating were adjusted so that the resulting ink-receptive layer contained about 60 wt. % of polyamide particles (Orgasol 3501); about 20 wt. % of non-polymeric organic particles (Michem 439); and about 20 wt. % of a thermoplastic polyamide film-forming binder (Elvamide 8023) based on total dry weight of the ink-receptive layer.

Comparative Example A

In this Comparative Example A, the following coating formulations were prepared.

| | Weight % |
|---|---|
| Hot Melt Coating | |
| ENOREX VN 379 [1] | 100% |
| Ink-Receptive Coating | |
| Water | 28% |
| Ethanol | 47% |
| Elvamide 8023 [2] | 5% |
| Orgasol 3501 [3] | 20% |

The above-described hot-melt and ink-receptive coatings were applied to a base substrate as further described below. The resulting ink-receptive layer contained about 80 wt. % of polyamide particles (Orgasol 3501); and about 20 wt. % of a thermoplastic polyamide film-forming binder (Elvamide 8023) based on total dry weight of the ink-receptive layer.

Comparative Example B

In this Comparative Example B, the following coating formulations were prepared.

| | Weight % |
|---|---|
| Hot Melt Coating | |
| ENOREX VN 379 [1] | 100% |
| Ink-Receptive Coating | |
| Water | 28% |
| Ethanol | 47% |
| Elvamide 8023 [2] | 5% |
| Orgasol 3501 [3] | 15% |
| MPP635vf [5] | 5% |

[5] Polymeric particles of polyethylene, available from Micro Powders, Inc. (Tarrytown, NY)

The above-described hot-melt and ink-receptive coatings were applied to a base substrate as further described below. The resulting ink-receptive layer contained about 60 wt. % of polyamide particles (Orgasol 3501); about 20 wt. % of polyethylene particles (MPP635 vf); and about 20 wt. % of a thermoplastic polyamide film-forming binder (Elvamide 8023) based on total dry weight of the ink-receptive layer.

Comparative Example B1

In this Comparative Example B 1, the coating formulations as described in above Comparative Example B were prepared, except the components in the ink-receptive coating were adjusted so that the resulting ink-receptive layer contained about 40 wt. % of polyamide particles (Orgasol 3501); about 40 wt. % of polyethylene particles (MPP635 vf); and about 20 wt. % of a thermoplastic polyamide film-forming binder (Elvamide 8023) based on total dry weight of the ink-receptive layer.

Comparative Example B2

In this Comparative Example B2, the coating formulations as described in above Comparative Example B were prepared, except the components in the ink-receptive coating were adjusted so that the resulting ink-receptive layer contained about 20 wt. % of polyamide particles (Orgasol 3501); about 60 wt. % of polyethylene particles (MPP635 vf); and about 20 wt. % of a thermoplastic polyamide film-forming binder (Elvamide 8023) based on total dry weight of the ink-receptive layer.

Comparative Example C

In this Comparative Example C, the following coating formulations were prepared.

| | Weight % |
|---|---|
| Hot Melt Coating | |
| ENOREX VN 379 [1] | 100% |
| Ink-Receptive Coating | |
| Water | 28% |
| Ethanol | 47% |
| Elvamide 8023 [2] | 5% |
| Orgasol 3501 [3] | 15% |
| Microthene FE532-00 [6] | 5% |

[6] Polymeric particles of poly(ethylene-co-vinyl acetate), available from Equistar Chemicals (Houston, TX).

The above-described hot-melt and ink-receptive coatings were applied to a base substrate as further described below. The resulting ink-receptive layer contained about 60 wt. % of polyamide particles (Orgasol 3501); about 20 wt. % of poly(ethylene-co-vinyl acetate) particles (Microthene FE532-00); and about 20 wt. % of a thermoplastic polyamide film-forming binder (Elvamide 8023) based on total dry weight of the ink-receptive layer.

Comparative Example C1

In this Comparative Example C1, the coating formulations as described in above Comparative Example C were prepared, except the components in the ink-receptive coating were adjusted so that the resulting ink-receptive layer contained about 40 wt. % of polyamide particles (Orgasol 3501); about 40 wt. % of poly(ethylene-co-vinyl acetate) particles (Microthene FE532-00); and about 20 wt. % of a thermoplastic polyamide film-forming binder (Elvamide 8023) based on total dry weight of the ink-receptive layer.

Comparative Example C2

In this Comparative Example C2, the coating formulations as described in above Comparative Example C were prepared, except the components in the ink-receptive coating were adjusted so that the resulting ink-receptive layer contained about 20 wt. % of polyamide particles (Orgasol 3501); about 60 wt. % of poly(ethylene-co-vinyl acetate) particles (Microthene FE532-00); and about 20 wt. % of a thermoplastic polyamide film-forming binder (Elvamide 8023) based on total dry weight of the ink-receptive layer.

Comparative Example D

In this Comparative Example D, the coating formulations as described in above Example 1 were prepared, except the components in the ink-receptive coating were adjusted so that the resulting ink-receptive layer contained no (0 wt. %) polyamide particles (Orgasol 3501); about 80 wt. % of non-polymeric organic particles (Michem 439); and about 20 wt. % of a thermoplastic polyamide film-forming binder (Elvamide 8023) based on total dry weight of the ink-receptive layer.

In above examples, the hot melt formulation was first applied to a silicone-coated support paper using a Meyer metering rod and dried in an oven at 110° C. for about 2 minutes. The ink-receptive coating was applied over the hot melt layer using a Meyer metering rod and dried in an oven at 110° C. for about 1 minutes. Per the Test Methods described above, images (prints) were produced on the ink-jet transfer papers, and the imaged T-shirts were evaluated for print-quality, wash-durability, and hand. The results are reported below in Table I.

TABLE I

| | Composition in dry film (% weight) | | | | | | | |
|---|---|---|---|---|---|---|---|---|
| | Particles | | | | Binder | Print | Color (after | Hand (after |
| Sample | A | B | C | D | E | quality | wash) | wash) |
| Example 1 | 40 | 40 | | | 20 | good | good | soft |
| Example 2 | 20 | 60 | | | 20 | good | good | soft |
| Example 3 | 60 | 20 | | | 20 | excellent | excellent | medium soft |
| Comparative Example A | 80 | | | | 20 | excellent | excellent | rough |
| Comparative Example B | 60 | | 20 | | 20 | excellent | excellent | rough |
| Comparative Example B1 | 40 | | 40 | | 20 | excellent | excellent | rough |
| Comparative Example B2 | 20 | | 60 | | 20 | good | good | rough |
| Comparative Example C | 60 | | | 20 | 20 | excellent | excellent | rough |
| Comparative Example C1 | 40 | | | 40 | 20 | good | good | rough |
| Comparative Example C2 | 20 | | | 60 | 20 | poor | poor | rough |
| Comparative Example D | 0 | 80 | | | 20 | good | fair | soft |

A Orgasol 3501 EX D-Polymeric particles of a polyamide.
B Michem 439-Non-polymeric particles of N,N'-1,2-ethanediylbisoctadecanamide.
C MPP 635vf-Polymeric particles of polyethylene.
D Microthene FE532-00-Polymeric particles of poly(ethylene-co-vinyl acetate).
E Elvamide 8023-Polyamide binder resin.

What is claimed is:

1. A method for applying an image to a fabric material, comprising the steps of:

a) providing an ink-jet printable heat-transfer medium, the medium comprising a base substrate having a front surface and back surface, the front surface coated with: i) a hot-melt layer comprising a thermoplastic polymer having a melting point in the range of about 60° C. to about 180° C., and ii) an ink-receptive layer overlaying the hot-melt layer, the ink-receptive layer comprising non-polymeric organic particles that are a reaction product of a diamine and two molecules, each molecule having at least one carboxylic acid group and at least five carbon atoms; thermoplastic polymer particles; and a thermoplastic film-forming binder having a melting point in the range of about 60° C. to about 180° C.;

b) printing an image on the front surface of the substrate with an ink-jet printer;

c) placing the imaged substrate on a fabric material so that the printed image faces downwards and contacts the fabric;

d) applying heat to the backside of the substrate so that the imaged film coating is pressed into the fabric and the image is transferred to the fabric; and e) peeling the substrate away from the transferred printed image on the fabric.

2. The method of claim 1, wherein the heat is applied to the substrate by means of an iron.

3. The method of claim 1, wherein the fabric is a white T-shirt.

* * * * *